United States Patent Office 3,849,496
Patented Nov. 19, 1974

3,849,496
PREPARATION OF AMINES FROM AMINE SALTS
Denis Forster, University City, Mo., assignor to Monsanto Company, St. Louis, Mo.
No Drawing. Continuation-in-part of abandoned application Ser. No. 177,489, Sept. 2, 1971. This application June 18, 1973, Ser. No. 371,090
Int. Cl. C07c 85/16
U.S. Cl. 260—583 N   5 Claims

ABSTRACT OF THE DISCLOSURE

Amines such as hexamethylenediamine are prepared from amine hydrohalides by contacting the amine hydrohalides with a high boiling anhydrous organic solvent in the presence of an excess of ammonia beyond the stoichiometric proportion required to neutralize the amine hydrohalide. Two liquid phases are formed with the free amine being present in the high boiling organic solvent phase.

---

The present patent application is a continuation-in-part of copending application Ser. No. 177,489 filed on Sept. 2, 1971, now abandoned.

This invention relates to a new method for the preparation and recovery of amines from amine salts, for example the preparation of hexamethylenediamine from salts thereof.

The present invention is of particular utility in the preparation of hexamethylenediamine, which is more difficult to produce than the common mono-amines. The mono-amines particularly the long chain compounds and their derivatives are used extensively as surface active agents, for example as flotation agents, while diamines are used in the manufacture of polymers such as nylons.

Several commercial processes for the production of mono-amines and diamines have been described. One of the methods described in the prior art involves aminating halo or dihalo-alkanes, also known as alkyl halides. The amination reaction between ammonia and alkyl halides to give amine salts has been known for many years but has not been considered as a practical method for the production of primary amines because of the low selectivity; furthermore, the amine salt produced requires treatment with an expensive base, e.g. NaOH, to liberate the free amine.

It is an object of this invention to provide a process for the production of amines from amine salts such as result from the ammonolysis of halo derivatives of hydrocarbons.

It is a further object of this invention to provide a process for separating hexamethylenediamine from salts thereof such as the hydrogen chloride or hydrogen bromide salt in an anhydrous system.

The present process for the preparation of amines from amine hydrohalides comprises contacting the amine hydrohalides with a high boiling anhydrous organic solvent having from 4 to 25 carbon atoms, and a boiling point in the range of from 50° C. to 350° C., and characterized by a boiling point at least 30° C. higher than the said amine, the said contacting being conducted in the presence of an excess of anhydrous ammonia beyond the stoichiometric proportion, relative to the proportion required to neutralize the aforesaid amine hydrohalides. The contacting is conducted under sufficient pressure and with sufficient excess of ammonia that a separate liquid phase consisting primarily of liquid ammonia is formed. The preferred proportion of ammonia is at least 50 wt. percent in excess of the stoichiometric amount required to neutralize the amine hydrohalide.

The process then continues with the separation of the aforesaid mixture into two liquid phases, respectively, comprising (a) a lower inorganic layer of the ammonia and the ammonium halide, derived from the said hydrohalide, and (b) the organic phase comprising the high boiling solvent containing the free amine. The process is carried out in a suitable vessel at a pressure sufficient to maintain the system in the liquid phase. The amine containing layer may be separated by decantation, centrifuging, etc., after which the organic phase is distilled to remove the amine from the organic solvent.

The temperature is not critical, and may conveniently be maintained at room temperature, or up to the boiling point of the solvent.

The separation process of the invention is applied to salts of amines and diamines, e.g., hexamethylenediamine dihydroiodide. The amine salt is contacted with a higher boiling solvent, e.g., one which is at least 30° C. higher in boiling point than the amino product desired, and which does not react with the amine and from which the amine is readily removed by distillation. Suitable high boiling solvents include butanols, pentanols, hexanols, heptanols, octanols, nonanols, decanols, undecanols, dodecanols, tridecanols, quadecanols, pentadecanols, as well as dihydroxy alcohols such as 1,6-hexanediol, 1,5-pentaneidiol, and mixtures thereof. In general the high boiling solvents have from 4 to 25 carbon atoms, and include not only the alcohols but also ethers such as diphenyl ether; nitroalkanes, such as nitrooctane and nitrobutane; nitroaryl compounds such as nitrobenzene, nitronaphthalene, nicluding both mono- and poly-substituted nitro compounds; nitriles such as acetonitrile, adiponitrile; an amides such as dimethylformamide; and also haloaromatic compounds such as chlorobenzene, toluene, xylene, naphthalene, anthracene, etc.

The advantages of the process described herein over processes described in the prior art, as exemplified by United States Patent No. 3,410,906 to Simpson can be summarized as follows:

(a) The present process is not limited to water-insoluble long chain amines. It is noted that the process of the said patent requires insoluble amines in order to provide for the separation of the amine from aqueous phase. On the contrary, the present process is especially useful for the shorter-chain amines including hexamethylenediamine which has a very high solubility in water.

(b) The use of a water-ammonia mixture in the prior art leads to a serious separation problem in the subsequent recycle of the ammonia, since water and ammonia cannot be separated completely by distillation.

(c) The process described in the prior art requires a double extraction procedure, since the amine is initially extracted from the ammonia-water-alcohol phase with a hydrocarbon which is then subsequently contacted with another alcohol in order to extract the amine in turn. By contrast, the process described herein requires only one extraction, followed by simple distillation to remove the amine from the higher boiling extraction solvent. It is also noteworthy that the present invention is limited to the use of solvents having a boiling point at least 30° C. higher than the amine being removed. In contrast all of the solvents in the said patent boil below and not above the amine. Thus the first example beginning at the bottom of column 4 of the Simpson patent utilizes dodecylamine with a solvent composed of isopropyl alcohol and water. The said amine boils at 259° C. while the isopropyl alcohol boils at 82°, showing a boiling point below that of the amine instead of above, as it required in the present invention.

(d) The process described herein is particularly useful and applicable for the production of polyamines such as diamines. By contrast, the process described in the above patent is not applicable to diamines because of the extremely high water-solubility of diamines e.g. Hexamethylenediamine which is extremely soluble in water to the extent of 870 grams per 100 grams of water at 25° C.

(e) The process described herein does not utilize aqueous halide-containing media. It is well-known that aqueous solutions containing halide are highly corrosive and require expensive materials of construction. Note the Simpson patent, column 5, lines 1 and 2 showing the need of a corrosion inhibitor with the aqueous alkyl halide.

(f) The present process requires considerably smaller quantities of solvents than the process described in the prior art. This is shown in the examples below, which illustrate the present invention but are not limitative of the invention.

Example 1

Hexamethylenediamine dihydrobromide (12.0 g.), tridecanol (12 g.) and ammonia (7 g.) (460 wt. percent of that required for stoichiometric neutralization of the dihydrobromide salt) are mixed together under 85 p.s.i.g. pressure at 30° C. in a pressure vessel fitted with sampling lines. Two liquid layers are formed with the lower layer being composed of ammonium bromide and ammonia (in excess of the stoichiometric proportion required to form ammonium bromide). The upper organic layer is siphoned out of the vessel and found to be tridecanol containing the hexamethylenediamine. The hexamethylenediamine is removed from the alcohol by distillation and the tridecanol returned to the pressure vessel. A series of ten extractions as described above serve to convert more than 90% of the hexamethylenediamine dihydrobromide of the free amine.

In another experiment, using ammonia at only 140 wt. percent of the stoichiometric proportion (e.g. an excess of 40 wt. percent) a viscous mass is obtained without the desired separation of free amine.

Example 2

An experiment is performed as described in the preceding example, except that 1-decanol is used in place of tridecanol. As in Example 1, 10 extractions serve to convert more than 90% of the hexamethylenediamine dihydrobromide to the free amine, which is distilled from the solvent.

Example 3

An experiment is performed as described in Example 1 with the following reactants: n-decylamine hydrochloride (10 g.) tridecanol (20 g.) and ammonia (10 g.). Two liquid layers are formed and the upper layer is removed and found to contain 30% of decylamine in tridecanol. Two extractions serve to convert more than 95% of the decylamine hydrochloride to decylamine, which is distilled from the solvent.

Example 4

This example provides a comparison of the present invention to determine the relative efficiency of the amine extraction schemes described in the prior art as exemplified by U.S. 3,410,906 when applied to diamine salts.

Hexamethylenediamine dihydrobromide (25 g.) isopropanol (10.4 ml.), water (2.6 ml.) and ammonia (8.5 g.) is charged to a reactor. The mixture is stirred at 200° C. for two hours. The reaction mixture is then cooled and the ammonia vented. Water (50 ml.) is added and the resulting solution is extracted with three 10 ml. portions of n-heptane. The heptane extraction solvent is then examined by a gas chromatographic technique capable of detecting 0.1% of hexamethylenediamine in a solvent. No hexamethylenediamine is detected in the heptane extraction solvent.

Example 5

This example is conducted to determine if modifying the extraction process described in U.S. 3,410,906 by using a long chain alcohol as the extraction solvent instead of heptane improves such a process markedly.

Hexamethylenediamine dihydrobromide (25 g.), isopropanol (10.4 ml.), water (2.6 ml.) and ammonia (8.5 g.) are charged to a reactor. The mixture is stirred at 200° C. for two hours. The reaction mixture is then cooled and the ammonia vented. Water (50 ml.) is added and the resulting solution is extracted with three 10 ml. portions of tridecanol. The tridecanol extraction solvent is examined by a gas chromatographic technique and found to contain a trace of hexamethylenediamine (less than 0.2% hexamethylenediamine). At this low efficiency, it requires a series of greater than 500 extractions to convert more than 90% of the hexamethylenediamine dehydrobromide to the free amine. An inefficient extraction scheme such as this would not be commercially viable.

A comparison with the results of Example 1 serves to demonstrate the great improvement in efficiency obtained by conducting the reaction in the substantial absence of water.

What is claimed is:

1. Process for the preparation of amines from amine hydrochlorides which comprises contacting the said amine hydrohalide with an anhydrous high boiling organic solvent having a boiling point in the range of from 50° C. to 350° C., and characterized by a boiling point at least 30° C. higher than the said anhydrous amine, the said contacting being conducted in the presence of an excess of at least 50 wt. percent of ammonia beyond the stoichiometric proportion required to neutralize the aforesaid amine hydrohalide with a resultant formation of two liquid phases, respectively, comprising (a) ammonia and dissolved ammonium halide, and (b) the high boiling solvent containing the free amine, and thereafter separating the said liquid phases.

2. Process as in Claim 1 in which the solution of the amine in the high boiling organic solvent is distilled to remove the amine from the said solvent.

3. Process as in Claim 1 in which the amine is hexamethylenediamine, and the amine hydrohalide is hexamethylenediamine dihydrobromide, and the high boiling organic solvent is tridecanol.

4. Process as in Claim 1 in which the amine is hexamethylenediamine, and the amine hydrohalide is hexamethylenediamine dihydrobromide, and the high boiling organic solvent is 1-decanol.

5. Process as in Claim 1 in which the amine is n-decylamine, the amine hydrohalide is n-decylamine hydrochloride and the high boiling organic solvent is tridecanol.

References Cited

UNITED STATES PATENTS 3,410,906  11/1968  Simpson et al. _____ 260—583 R
3,751,474   8/1973  Phillips et al. _____ 260—583 P

OTHER REFERENCES

French Patent Abstracts, 8 No. 14 5:3 (April 8, 1968).

LEWIS GOTTS, Primary Examiner

D. R. PHILLIPS, Assistant Examiner

U.S. Cl. X.R.

260—583 R, 583 P, 585 A

UNITED STATES PATENT OFFICE
CERTIFICATE OF CORRECTION

PATENT NO. : 3,849,496
DATED : November 19, 1974
INVENTOR(S) : Denis Forster

It is certified that error appears in the above-identified patent and that said Letters Patent are hereby corrected as shown below:

IN THE CLAIMS

Claim 1, line 2, "hydrochlorides", should read --hydrohalides--.

Signed and Sealed this seventh Day of October 1975

[SEAL]

Attest:

RUTH C. MASON
Attesting Officer

C. MARSHALL DANN
Commissioner of Patents and Trademarks